US008590207B1

(12) United States Patent
Shih

(10) Patent No.: US 8,590,207 B1
(45) Date of Patent: Nov. 26, 2013

(54) SOLAR GARDENING SYSTEM

(76) Inventor: Hsiao-Ling Shih, New Taipei (TW)

( * ) Notice: Subject to any disclaimer, the term of this patent is extended or adjusted under 35 U.S.C. 154(b) by 0 days.

(21) Appl. No.: 13/603,157

(22) Filed: Sep. 4, 2012

(30) Foreign Application Priority Data

May 8, 2012 (TW) ................................ 101208622

(51) Int. Cl.
*A01G 9/02* (2006.01)
*A01G 9/20* (2006.01)

(52) U.S. Cl.
USPC ................................................ 47/66.6; 47/60

(58) Field of Classification Search
USPC ........... 47/59 R, 60, 62 R, 62 N, 17, 18, 19.1, 47/66.6
See application file for complete search history.

(56) References Cited

U.S. PATENT DOCUMENTS

| | | | | |
|---|---|---|---|---|
| 3,807,088 | A * | 4/1974 | Jones | 47/62 N |
| 3,925,928 | A * | 12/1975 | Constantinescu et al. | 47/17 |
| 4,209,943 | A * | 7/1980 | Moeller et al. | 47/1.4 |
| 4,242,833 | A * | 1/1981 | Maes, Jr. | 47/17 |
| 4,332,105 | A * | 6/1982 | Nir | 47/1.01 R |
| 4,430,828 | A * | 2/1984 | Oglevee et al. | 47/17 |
| 4,567,732 | A * | 2/1986 | Landstrom et al. | 62/91 |
| 4,569,150 | A * | 2/1986 | Carlson et al. | 47/17 |
| 4,754,571 | A * | 7/1988 | Riechmann | 47/59 R |
| 4,788,791 | A * | 12/1988 | Sprung | 47/17 |
| 5,209,012 | A * | 5/1993 | Palmer | 47/17 |
| 5,213,981 | A * | 5/1993 | Sei | 435/286.4 |
| 5,355,618 | A * | 10/1994 | Pedersen | 47/18 |
| 5,713,154 | A * | 2/1998 | Goldstein et al. | 47/17 |
| 6,578,319 | B1 * | 6/2003 | Cole et al. | 47/61 |
| 7,559,173 | B2 * | 7/2009 | Brusatore | 47/82 |
| 8,250,809 | B2 * | 8/2012 | Simmons | 47/62 N |
| 2003/0188477 | A1 * | 10/2003 | Pasternak et al. | 47/17 |
| 2004/0194371 | A1 * | 10/2004 | Kinnis | 47/17 |
| 2004/0244283 | A1 * | 12/2004 | Chen | 47/17 |
| 2005/0055878 | A1 * | 3/2005 | Dumont | 47/62 R |
| 2009/0313894 | A1 * | 12/2009 | Bieber | 47/62 R |
| 2011/0061297 | A1 * | 3/2011 | Simmons | 47/62 A |
| 2012/0000121 | A1 * | 1/2012 | Swann | 47/17 |
| 2012/0000126 | A1 * | 1/2012 | Walsh, Jr. | 47/60 |
| 2012/0054061 | A1 * | 3/2012 | Fok et al. | 705/26.5 |
| 2012/0060416 | A1 * | 3/2012 | Brusatore | 47/62 A |
| 2012/0311926 | A1 * | 12/2012 | Mittelmark | 47/17 |

* cited by examiner

*Primary Examiner* — Son T Nguyen
(74) *Attorney, Agent, or Firm* — Chun-Ming Shih

(57) ABSTRACT

A solar gardening system includes a cultivation box; an LED lamp assembly for illuminating the cultivation box; and a power source including a photovoltaic system including a plurality of solar modules electrically connected together, a controller electrically connected to the solar modules, and a rechargeable battery electrically connected to the controller wherein the controller is configured to cause the rechargeable battery to supply electricity to the LED lamp assembly. The LED lamp as light source for plant growth can save energy and prolong lifecycle. Further, the LED lamp can emit monochrome with narrow wavelength. Moreover, the number of LED lamps can be increased or decreased depending on growth seasons so as to provide sufficient illumination to plants being grown. Thus, plants can be well grown.

4 Claims, 1 Drawing Sheet

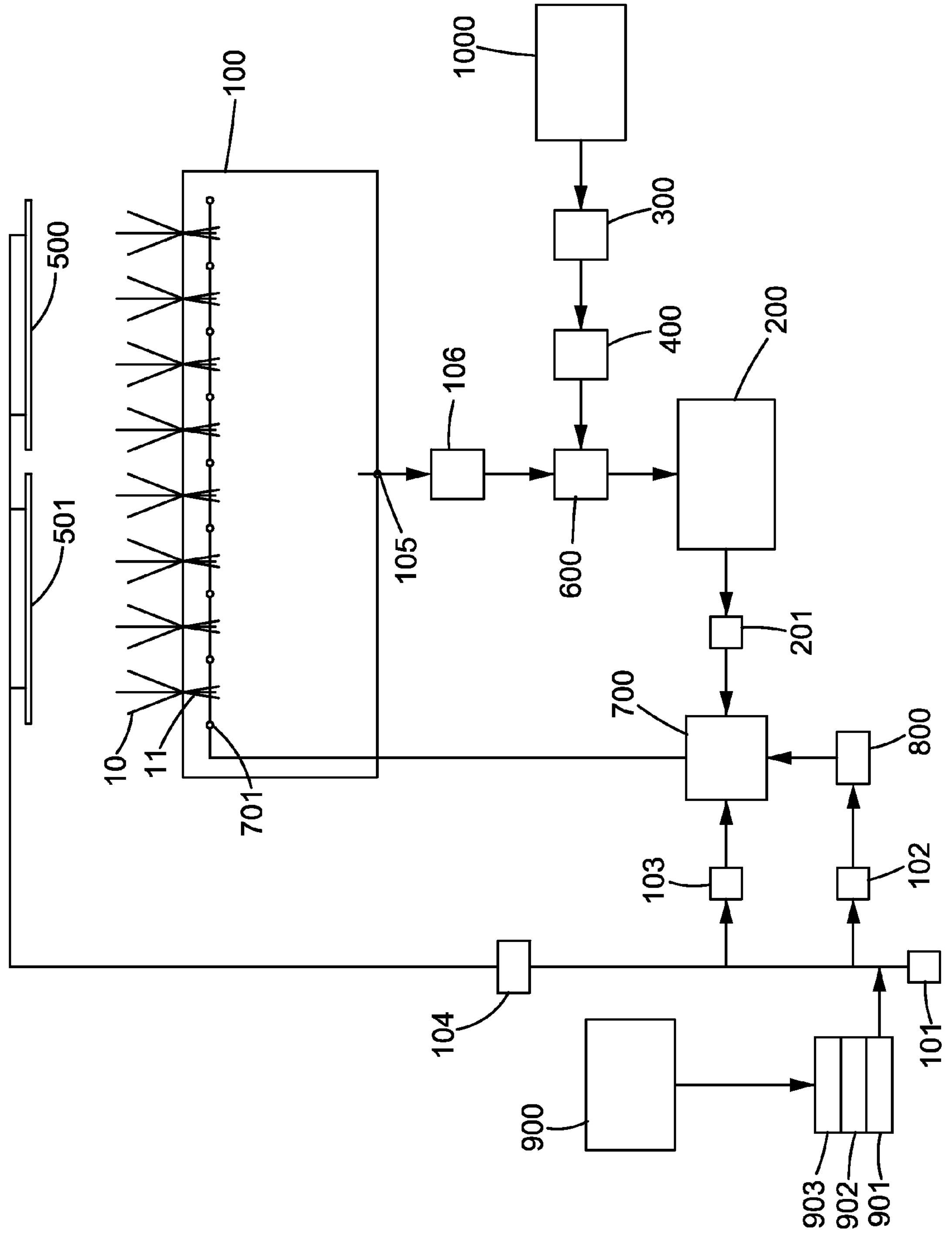
1000
300
400
200
106
100
500
501
105
600
201
700
800
10
11
701
103
102
104
101
900
903
902
901

SOLAR GARDENING SYSTEM

BACKGROUND OF THE INVENTION

1. Field of the Invention

The invention relates to gardening greenhouse and more particularly to a solar gardening system including light-emitting diode (LED) lamps and a photovoltaic system.

2. Description of Related Art

Agriculture and gardening are energy consumption practices. Thus, how to save energy of gardening is an important issue to be addressed. Energy consumed in gardening mainly comes from non-renewable energy and thus the energy cost is the greatest portion of all costs of gardening. Typically, lamps for gardening include high pressure sodium lamps, fluorescent lamps, halogen lamps and incandescent lamps. However, these lamps are disadvantageous for consuming much energy. For example, a halogen lamp used by a greenhouse may consume 200 kw/hr. For a seeding house equipped with fluorescent lamps, illumination cost is about 82% of its energy consumption. For a hotbed structure equipped with fluorescent lamps, illumination cost of three-tier structure is 800 $W/m^2$ which is about 45%-55% of its energy consumption. For a hotbed structure equipped with fluorescent lamps, illumination cost of four-tier structure is 500-600 $W/m^2$ which is about 30%-40% of its energy consumption. In view of above analysis, it is desirable of providing a photovoltaic system for gardening so as to lower the management cost.

Moreover, fogging is also involved in gardening. Fogging typically employs a atomizer or ultrasonic device for atomizing water into fine particles which are in turn spraying onto plant roots for irrigation and cultivation purposes. However, the typical fogging systems suffer the following drawbacks: Rate of plants absorbing nutrition contained in water is low. Nutrition contained in water may clog the piping after a period time of use. And in turn it may adversely affect the fogging effect. Water is not filtered and may be polluted. And in turn it may harm the plants. Finally, fogging may be interrupted due to power outage. And in turn, it may stop providing nutrition to the plants, thereby adversely affecting growth of the plants.

Thus, the need for improvement still exists.

SUMMARY OF THE INVENTION

It is therefore one object of the invention to provide a solar gardening system a cultivation box; an LED lamp assembly for illuminating the cultivation box; and a power source including a photovoltaic system comprising a plurality of solar modules electrically connected together, a controller electrically connected to the solar modules, and a rechargeable battery electrically connected to the controller wherein the controller is configured to cause the rechargeable battery to supply electricity to the LED lamp assembly.

By employing the solar gardening system of the invention, a garden powered by pure commercial power can be completely replaced by the photovoltaic system or power generated by the photovoltaic system can be employed as a portion of the total power consumed by the garden as a complement in case of power outage or insufficient power. Thus, a normal operation of the garden or farm can be maintained. Further, LED lamps of the invention is employed as a replacement of conventional pressure sodium lamps, fluorescent lamps, halogen lamps and incandescent lamps for plant growth. Furthermore, the controller is directly electrically connected to the rechargeable battery for electricity storage therein so that direct current can be supplied to the LED lamp assembly from the rechargeable battery in use. This has the advantage of eliminating the energy loss process of converting alternating current to direct current.

In a first aspect of the invention, the LED lamp assembly comprises at least two LED lamps each capable of emitting a predetermined light of one color with different wavelengths. It is understood that illumination for plants of different growth seasons and different parts such as roots and leaves of the plants are different. By employing the solar gardening system of the invention and the LED lamps being capable of emitting monochrome with narrow wavelength, the number of LED lamps can be increased or decreased depending on growth seasons so as to provide sufficient illumination to plants being grown.

In a second aspect of the invention, the LED lamp assembly comprises a red, orange LED lamp and a blue, violet LED lamp. For growing plants in gardens or farms, red, orange light having a wavelength of 610-720 nm with a peak of 660 nm is used mainly. Solar energy of the red, orange light absorbed is about 55% of the total radiation. Secondly, blue, violet light having a wavelength of 400-510 nm with a peak of 450 nm is used. Solar energy of the blue, violet light absorbed is about 8% of the total radiation. Thus, the LED lamp assembly can emit monochrome (e.g., peak of 450 nm of blue light, peak 660 nm of red light) required for the growth of plants. A combination of red and blue LEDs can create a spectrum absorption peak value for facilitating photosynthesis. About 80-90% of solar energy can be absorbed by the solar gardening system of the invention. Thus, the energy saving effect of the invention is significant.

In a third aspect of the invention, the photovoltaic system further comprises an inverter electrically interconnecting the controller and the LED lamp assembly. By employing the inverter, DC can be converted into AC which can be supplied to the LED lamp assembly in parallel to the general power. Therefore, the photovoltaic system can be employed as a part of the general power.

In a fourth aspect of the invention, the solar gardening system further comprises an ultrasonic fogging system electrically connected to the inverter.

In a fifth aspect of the invention, the ultrasonic fogging system comprises a water source, a magnetizer disposed downstream of the water source, an nutrition liquid pool disposed downstream of the magnetizer, and an ultrasonic atomizer disposed downstream of the nutrition liquid pool; and wherein the ultrasonic atomizer comprises a fan in fluid communication with the ultrasonic atomizer, and a plurality of aerosol nozzles disposed adjacent to roots of a plurality of plants in the cultivation box, the aerosol nozzles being in fluid communication with the ultrasonic atomizer.

In a sixth aspect of the invention, by employing the solar gardening system water undergoes a magnetization process with chemical components of water being unchanged but physical structure of mineral components of water changes. Chained large molecules are broken into small molecules and water molecule dipole torque is deflected after the magnetization. Positive and negative ions (i.e., scale molecules) of solved salt in water are surrounded by mono-molecules. Thus, needle structures of scales including calcium and magnesium molecules in water are transformed into grainy crystalline structures. Further, adhesion and coagulation properties are damaged. Thus, no scale is formed on the heated surface or wall. The grainy crystalline is drained out of exits. Moreover, attraction between positive and negative ions of salt is increased due to the increase of water dipole torques. The existing scale on an inner surface of pipe is gradually broken, loosened, and disengaging. It is found that both physical and chemical properties of magnetized water are changed. In detail, conductivity is increased to 2%, pH is increased to 0.4-1.0, and surface expansion is dropped 1-2% for water. Erosion angle of solid is increased greatly, thereby increasing erosion capability greatly and increasing evaporation rate greatly. Dissolvability is increased 20-70%, evaporation permeability is increased 1.34 times, and content of dissolve oxygen in increased 3-6 mg/L for some salt compounds. Microorganisms and biologic creatures in the growth environment of water are changed. In addition, nutrition of small molecules can be easily absorbed by plants, thereby increasing growth.

In a seventh aspect of the invention, nutrition liquid is further underwent an ultrasonic fogging process to form fog of 1-3 μm. This has the benefit of increasing time nutrition molecules suspended in the pores of roots of plants for more than two hours. And in turn, it can facilitate nutrition to be absorbed by the plants and increase nutrition molecules to be absorbed by the plants and its absorption rate. Further, no pressure exists in the process of conveying ultrasonic nutrition liquefied fog. To the contrary, only gaseous flow exists. Thus, fog may permeate the roots by flowing through connected channels in the roots. This can prolong the time of suspending fog in the roots as compared with the conventional foggy suspension. Energy loss is thus greatly decreased in the transmission. No water hammer exists to bring root washing effect due to no pressure. As a result, roots have good properties, grow well, and have good nutrition absorption.

In an eighth aspect of the invention, further comprises an ultraviolet (UV) sterilizer disposed downstream of the magnetizer and the nutrition liquid pool for disinfecting water by killing microorganisms. This has the advantages of not causing massive damage to crops, preventing various viruses and microorganisms from damaging roots of plants during growth seasons, and keeping good growth of plants.

In a ninth aspect of the invention, the cultivation box comprises a back to the outlet for flowing water from the cultivation box to the nutrition liquid pool via the UV sterilizer. By utilizing this arrangement, water not absorbed by plants can be recycled for saving water resource. Further, the UV sterilizer can disinfect water by killing microorganisms.

In a tenth aspect of the invention, the ultrasonic fogging system further comprises a screening program disposed between the UV sterilizer and the magnetizer.

In an eleventh aspect of the invention, further comprises a first timer interconnecting the inverter and the LED lamp assembly, and a second timer interconnecting the inverter and the ultrasonic fogging system.

The solar gardening system of the invention has the following advantages as compared with the related art:

The photovoltaic cells can convert the energy of light directly into electricity (direct current (DC)) by the photovoltaic effect. The electricity can be supplied to the cultivation box for illuminating the plants being grown as a replacement of the general power or as a portion of the power required for the plant growth.

The LED lamps are used as plant growth lamps for photosynthesis. Further, the LED lamps can save more energy as compared with the typical high pressure sodium lamps, incandescent lamps, and fluorescent lamps. It is understood that energy consumed by an LED lamp is about one-eighth of an incandescent lamp and about half of a fluorescent lamp. Furthermore, LED lamps have prolonged lifespan. Moreover, LED lamps can emit monochrome with narrow wavelength. Moreover, the number of LED lamps can be increased or decreased depending on growth seasons so as to provide sufficient illumination to plants being grown. Thus, plants can be well grown.

The above and other objects, features and advantages of the invention will become apparent from the following detailed description taken with the accompanying drawings.

BRIEF DESCRIPTION OF THE DRAWINGS

The invention, as well as its many advantages, may be further understood by the following detailed description and drawings in which:

FIG. 1 is a block diagram of a solar gardening system according to the invention.

DETAILED DESCRIPTION OF THE INVENTION

Referring to FIG. 1, a solar gardening system in accordance with the invention comprises a cultivation box 100, a first LED lamp 500, a second LED lamp 501, a photovoltaic system, and an ultrasonic fogging system. Each of the above components will be discussed in detail below.

Each of the first and second LED lamps 500, 501 comprise an LED light source and a printed circuit board (PCB). Each of the first and second LED lamps 500, 501 are capable of emitting red, orange light of wavelength 457.6 nm and blue, violet light of wavelength 630.4 nm in which light intensity of the red, orange light is eight times of that of the blue, violet light. Preferably, each of the first and second LED lamps 500, 501 comprise a plurality of red, orange LEDs and blue, violet LEDs of equal power in which the number of the red, orange LEDs is eight times of that of the blue, violet LEDs.

The photovoltaic system comprises a plurality of solar modules 900 electrically connected together, each solar module 900 having a plurality of photovoltaic cells for converting the energy of light directly into electricity (direct current (DC)) by the photovoltaic effect, a controller 903 electrically connected to the solar modules 900, a rechargeable battery 902, and an inverter 901 electrically connected to the battery 902. In the daytime, DC from the solar modules 900 is stored in the battery 902 via the controller 903. In the nighttime, DC is converted into alternating current (AC) by the inverter 901 as instructed by the controller 903. AC is fed to the general power 101. A third timer 104 is interconnected the general power 101 and the first and second LED lamps 500, 501.

A first timer 102 is interconnected the general power 101 and a fan 800. A second timer 103 is interconnected the general power 101 and an ultrasonic atomizer 700. Both the fan 800 and the ultrasonic atomizer 700 are parts of the ultrasonic fogging system as described below. Further, activations of both the ultrasonic atomizer 700 and the fan 800 are controlled by the third and second times 103, 102 respectively.

The ultrasonic fogging system comprises a water source 1000, a magnetizer 300 disposed downstream of the water source 1000 for magnetizing water, a screening program 400 disposed downstream of the magnetizer 300 for water purification, an ultraviolet (UV) sterilizer 600 disposed downstream of the screening program 400 for disinfecting water fed from the screening program 400, and an nutrition liquid pool 200 disposed downstream of the UV sterilizer 600 for temporarily storing energy water. Energy water is supplied from the nutrition liquid pool 200 to the ultrasonic atomizer 700 via an automatic water valve 201. Water is pressurized by the ultrasonic atomizer 700 and in turn the pressurized water flows to a plurality of aerosol nozzles 701 by the fan 800. The aerosol nozzles 701 are disposed proximate roots 11 of a plurality of plants 10 in the cultivation box 100. As a result, fine water drops are sprayed from the aerosol nozzle 701 onto the roots 11 for irrigation. Excess water may flow from the cultivation box 100 to the nutrition liquid pool 200 via a back to the outlet 105, a check valve 106, and the UV sterilizer 600 for recycling.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A gardening system comprising:

a cultivation box;

an LED lamp assembly for illuminating the cultivation box, wherein the LED lamp assembly includes a plurality of red, orange LEDs and a plurality of blue, violet LEDs to emit red, orange light having a wavelength of 610-720 nm with a peak of 660 nm and blue, violet light having a wavelength 400-510 nm with a peak of 450 nm, respectively, and light intensity of the red, orange light is eight times of that of the blue, violet light, and wherein solar energy of the red, orange light absorbed is about 55% of a total radiation, solar energy of the blue, violet light absorbed is about 8% of the total radiation, and a combination of the red, orange LEDs and the blue, violet LEDs creates a spectrum absorption peak value for facilitating photosynthesis with about 80-90% of solar energy to be absorbed by the solar gardening system so that an energy saving effect is significant;

a power source comprising a photovoltaic system including a plurality of solar modules electrically connected together, a controller electrically connected to the solar modules, a rechargeable battery electrically connected to the controller wherein the controller is configured to cause the rechargeable battery to supply electricity to the LED lamp assembly, and an inverter electrically interconnecting the controller and the LED lamp assembly; and an ultrasonic fogging system electrically connected to the inverter, wherein the ultrasonic fogging system comprises a water source, a magnetizer disposed downstream of the water source, an nutrition liquid pool disposed downstream of the magnetizer, an ultraviolet (UV) sterilizer disposed downstream of the magnetizer and the nutrition liquid pool for disinfecting water, a screening program disposed between the UV sterilizer and the magnetizer for water purification, and an ultrasonic atomizer disposed downstream of the nutrition liquid pool, wherein the ultrasonic atomizer comprises a fan in fluid communication with the ultrasonic atomizer, and a plurality of aerosol nozzles disposed adjacent to roots of a plurality of plants in the cultivation box, the aerosol nozzles being in fluid communication with the ultrasonic atomizer, and wherein the cultivation box comprises a back to the outlet for flowing water from the cultivation box to the nutrition liquid pool via the UV sterilizer, a check valve is disposed between the UV sterilizer and the back to the outlet a first timer interconnecting the inverter and the LED lamp assembly, and a second timer interconnecting the inverter and the ultrasonic fogging system;

thereby, by employing solar gardening system water undergoes a magnetization process with chemical components of the water being unchanged but physical structure of mineral components of the water changes, chained large molecules are broken into small molecules and water molecule dipole torque is deflected after the magnetization, scale molecules including positive and negative ions of solved salt in the water are surrounded by mono-molecules, thus needle structures of scales including calcium and magnesium molecules in the water are transformed into grainy crystalline structures, attraction between positive and negative ions of salt is increased due to increase of the water dipole torques, both physical and chemical properties of magnetized water are changed with conductivity increasing 2%, pH increasing 0.4-1.0, and surface expansion dropping 1-2% for the water.

2. The gardening system of claim 1, wherein each LED lamp emit a predetermined light of one color with different wavelength.

3. The gardening system of claim 1, wherein each of the red, orange LEDs emits the red, orange light of wavelength 630.4 nm, and each of the red, orange LEDs emits the blue, violet light of wavelength 457.6 nm.

4. The gardening system of claim 1, wherein the red, orange LEDs and the blue, violet LEDs are of equal power, and the number of the red, orange LEDs is eight times of that of the blue, violet LEDs.

* * * * *